United States Patent [19]

Jaksic

[11] Patent Number: 4,787,263
[45] Date of Patent: Nov. 29, 1988

[54] AUTOMATIC SELF-ADJUSTING CABLE SYSTEM

[75] Inventor: Miroslav Jaksic, Ann Arbor, Mich.

[73] Assignee: Acco Babcock Inc., Fairfield, Conn.

[21] Appl. No.: 28,761

[22] Filed: Mar. 23, 1987

[51] Int. Cl.⁴ ............................................. F16C 1/10
[52] U.S. Cl. ............................. 74/501.5 R; 74/502.4;
74/502.5; 188/196 B; 192/111 A; 192/70.25
[58] Field of Search ........ 74/501.5 R, 500.5, 501.5 H,
74/501.6, 502, 502.4, 502.6; 192/111 A, 70.25,
30 W; 188/196 P, 196 B, 196 V

[56] References Cited

U.S. PATENT DOCUMENTS

| 4,344,518 | 8/1982 | Gilmore | 192/111 A |
| 4,548,093 | 10/1985 | Nomura et al. | 74/501 R |
| 4,598,809 | 7/1986 | Glover et al. | 192/111 A |
| 4,603,752 | 8/1986 | Chambers et al. | 74/501 R |
| 4,631,975 | 12/1986 | Suzuki | 74/501 R |
| 4,669,330 | 6/1987 | Stocker | 74/501 R |
| 4,690,262 | 9/1987 | Hoyle | 192/111 A |

FOREIGN PATENT DOCUMENTS

| 1264777 | 2/1972 | United Kingdom | 192/111 A |
| 2176861 | 1/1987 | United Kingdom | 192/111 A |

Primary Examiner—Richard E. Moore
Assistant Examiner—Vinh Luong
Attorney, Agent, or Firm—Barnes, Kisselle, Raisch, Choate, Whittemore & Hulbert

[57] ABSTRACT

An automatic self-adjusting cable system comprising first, second and third cables, each including a conduit and a strand extending through the conduit. A self adjusting mechanism is provided and includes a housing, an inner member movable axially relative to the housing and a clutch between the housing and the member comprising a plurality of collet members which are movable radially and longitudinally and surround the member to cause teeth on the collets to disengage and engage teeth on the axially movable member. A spring extends between the collet housing and the conduit of the first cable. The strand of the first cable is connected to the movable member of the collet assembly. The strand of the first cable extends through the inner member of the collet clutch and is attached to the strand of the third cable. The strand of the second cable is connected to the collet housing. When a load is applied to the strand of the first cable, the strand tends to move toward the collet housing. The resisting force created by the second and third cables causes the collets to be forced into locking position to sustain the load. If there is slack in the system, the spring exerts force between the collet housing and the first conduit until a balance of force occurs, the collets moving out of engagement with the movable member until the slack is removed.

2 Claims, 2 Drawing Sheets

AUTOMATIC SELF-ADJUSTING CABLE SYSTEM

This invention relates to self-adjusting cable mechanisms.

BACKGROUND AND SUMMARY OF THE INVENTION

In cable systems, it is desirable to provide for automatic or self-adjustment to take up slack in the systems. For example, in a parking brake system, three cables might be used, each of which includes a conduit and a strand extending through the conduit. The cables are interconnected such that a force applied to a first cable is transmitted to the second and third cables extending to the rear brakes.

In application Ser. No. 832,526 filed Feb. 21, 1986, having a common assignee with the present application, there is disclosed a self-adjusting cable control device for automatically compensating for wear in a control cable system. The device includes a termination member connected at one end of a control cable and a connecting member attached to an actuation member. The connecting member carries a clutch for locking with the termination member upon application of force to the actuation member. Spring means are provided to move the cable with respect to the actuation member when the clutch is disengaged from the termination member. The clutch comprises a plurality of collet members which are movable radially and longitudinally and surround the termination member. The collet members have conical surfaces at one end adapted to engage complementary conical surfaces on the connecting member and serrations which engage complementary serrations on the collet members. The control device further includes a release tube that is accessible from the exterior of the device and can be engaged and moved axially inwardly by a clip to disengage the collet members and thereby permit easy connection of the device to the cables. In addition, provision is made for a separate clip normally holding the tube in a position and operable to release the release tube and the collet members to operative position.

Among the objectives of the present invention are to provide a self-adjusting system which functions on the basis of changing the anchorage point on a conduit to maintain the conduit system; which is low in cost, lighter in weight, wherein the weight is supported by a conduit rather than a strand, wherein the strand loads are in line, and which can be readily assembled for use.

In accordance with the invention, the self-adjusting cable system comprising first, second and third cables, each including a conduit and a strand extending through the conduit. A self adjusting mechanism is provided and includes a collet housing, an inner member movable axially relative to the collet housing and a clutch between the housing and the member comprising a plurality of collet members which are movable radially and longitudinally and surround the member to cause teeth on the collets to disengage and engge teeth on the axially movable member. A spring extends between the collet housing and the conduit of the first cable. The strand of the first cable is connected to the movable member of the collet assembly. The strand of the first cable extends through the inner member of the collet clutch and is attached to the strand of the third cable. The strand of the second cable is connected to the collet housing. When a load is applied to the strand of the first cable, the strand tends to move toward the collet housing. The resisting force created by the second and third cables causes the collets to be forced into locking position to sustain the load. If there is slack in the system, the spring exerts force between the collet housing and the first conduit until a balance of force occurs, the collets moving out of engagement with the movable member until the slack is removed.

DESCRIPTION OT THE DRAWINGS

Figure 3:
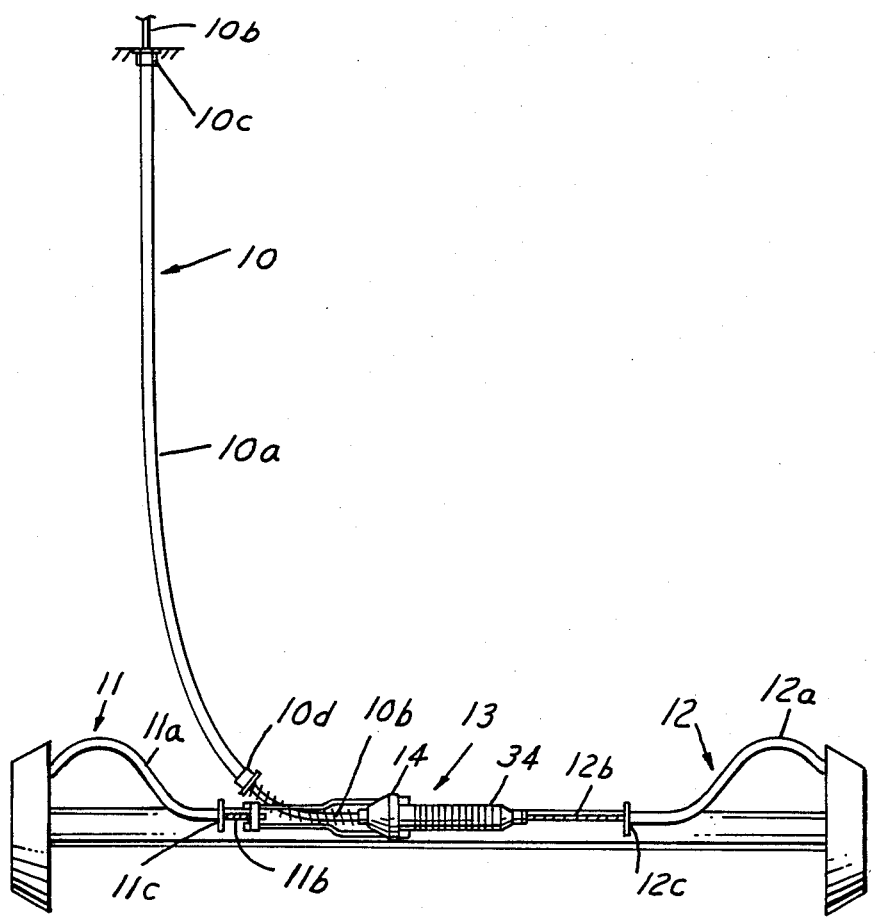
FIG. 3 is a schematic view of a parking brake system embodying the invention.

The present invention is directed to an adjusting system for cable systems such as used, for example, in automative brake systems wherein one cable 10 attached to an actuator such as a parking brake pedal or the like functions to actuate two cables 11, 12 extending to devices being actuated such as two rear brakes (FIG. 3).

The self-adjusting control system embodying the invention comprises three cables 10, 11 and 12 each of which includes a conduit 10a, 11a, 12a and a strand 10b, 11b, 12b. The system further includes a one-way adjusting mechanism 13. The outer end 10c of conduit 10a is fixed as are the outer ends of the conduits 11a, 12a. The inner end 10d of the conduit 10a is not fixed in space. The inner end 11c of conduit 11 is fixed in space as is the inner end 12c of conduit 12a.

Figure 1:
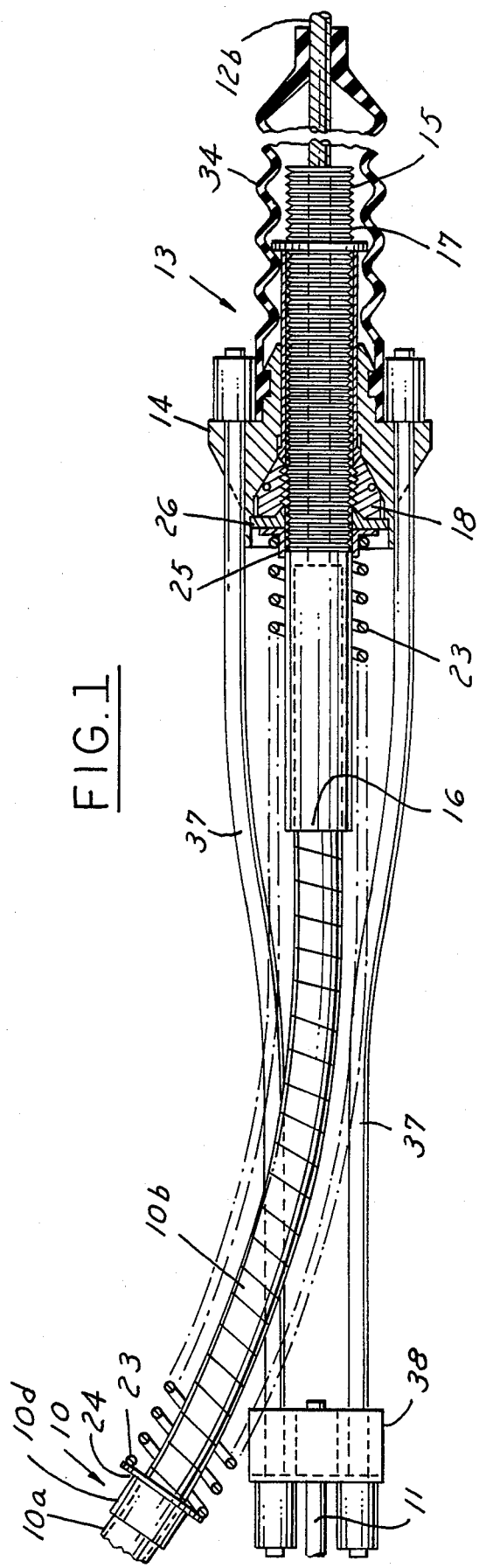
FIG. 1 is a fragmentary longitudinal sectional view of a portion of a system embodying the invention.
Figure 2:
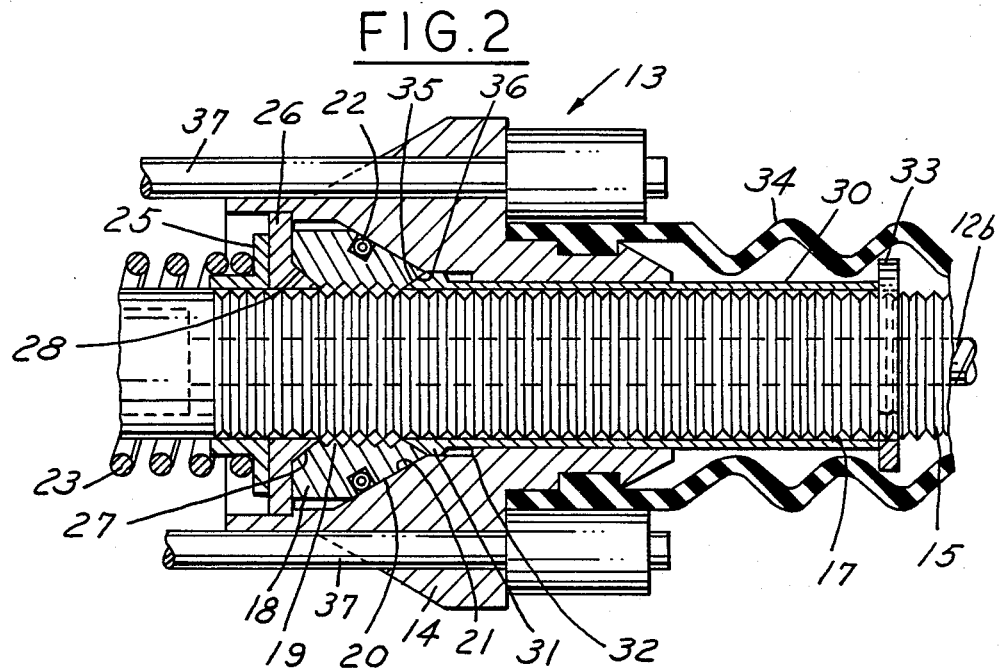
FIG. 2 is a fragmentary sectional view on an enlarged scale of a portion of the system shown in FIG. 1.

As shown in FIGS. 1 and 2, the one-way adjusting device 13 comprises a tubular housing 14 and an inner member 15 to which strand 10b is connected as by crimping at 16. Strand 12b is also connected to the inner member 15. Inner member 15 is formed with a plurality of annular symmetrical serrations or teeth 17 and a plurality of collet members 18 are positioned about the inner member 15 within the tubular housing 13. The collet members 18 have complementary serrations or teeth 19 engaging the serrations on the inner member 15. The collet members 18 include external conical surfaces 20 at one end adapted to engage a complementary internal conical surface 21 on the housing 14. A circular retaining spring 22 extends circumferentially in aligned grooves in each collet member 18 to yieldingly urge the collet members 18 toward the inner member 15.

A helical compression spring 23 is interposed between an abutment 24 fixed on the inner end of conduit 10a and a retainer 25 engaging a washer 26 fixed on the end of the housing 14. Spring 23 yieldingly urges the conduit 10a outwardly of the housing 14 and to the left as seen in FIGS. 1 and 2. The collet members 18 include internal conical surfaces 27 that engage a complementary surface 28 on washer 26.

Serrations 19, 17 on the collet members 18 and inner member 15 are preferably annular and symmetrical in the form of teeth which have a triangular cross section preferably with an included angle of ninety degrees (90°). The interengagement of the internal surfaces 27 and external conical surface 28 of the collet members 18 and washer 26 causes the collet members to disengage over the complete length of the serrations.

The angle which the surfaces 27 on the collet 14 members 18 make with the axis of the housing 14 is slightly greater than the angle which the conical surface 28 makes with the axis of housing 14.

The device further includes a release tube 30 that extends through and is guided by housing 14 and surrounds the inner member 15. The release tube 30 includes an enlarged inner end 31 that engages a shoulder 32 on the housing 14 retaining the tube 30 against axially outward movement. The release tube 30 is operated by manual engagement of an annular rib 33 through an elastic shroud 34 with a clip 33 to urge the collets 18 to the left as viewed in FIG. 1 to the position shown in FIG. 2, thereby disengaging the collets 14 and permitting disassembly or adjustment of the device. The end of each collet 18 nearest the release tube 30 is formed with a frustoconical surface 35 that extends radially and axially inwardly from the end nearest the tube 30. The surfaces 35 are engaged by a complementary frustoconical surface 36 on the enlarged end 31 of the release tube 30 to force the collets 18 radially outwardly and cause the serrations 19 on the collets 18 to disengage from the serrations 17 on the inner member 13.

Housing 14 is connected by spaced flexible strands 37 extending from housing 14 to a bracket 38 connected to strand 11.

Automatic adjustment occurs to remove slack as follows. The spring 23 urges the conduit 10a and, in turn, the inner member 15 to the left causing surfaces 19 on the collet members 18 to engage the surface 28 on washer 26. This, in combination with the normal component of force acting on teeth 19, forces the collet members 18 to move radially outwardly disengaging the teeth 19, 21 until a balance of forces occurs and the slack is removed and the teeth re-engage.

When a force is applied through strand 10b, the conduit 10a moves to the right as viewed in FIGS. 1–3. A resistant force is created by the cables 11b, 12c and the collet members 18 are forced to lock down on teeth 17 to sustain the load.

It can thus be seen that a self-adjusting system is provided which functions on the basis of changing the anchorage point on a conduit to maintain the conduit system; which is low in cost, lighter in weight, wherein the weight is supported by a conduit rather than a strand, wherein the strand loads are in line, and which can be readily assembled for use.

I claim:

1. An automatic self-adjusting cable system comprising first, second and third cables, each including a conduit and a strand extending through the conduit, wherein the first strand is the actuator strand and the second strand and third strand are connected to devices to be actuated,
a housing,
a member movable axially relative to the housing, and
a clutch between the housing and the member comprising a plurality of collet members which are movable radially and longitudinally and surround the member,
a spring extending between the collet housing and the first conduit,
said housing being attached to the strand of the second cable,
said inner member being attached to the third strand,
such that when a load is applied to the strand of the first cable, the strand tends to move toward the collet housing, the resisting force created by the second and third cables causing the collets to be forced into locking position to sustain the load, and when there is slack in the system, the spring exerts force on the housing moving the collets out of engagement with the member until the slack is removed and a balance of force occurs and the collets re-engage the inner member,
said compression spring surrounding a portion of said first conduit and said first strand,
a pair of flexible strands connecting said housing and the second strand.

2. An automatic self-adjusting cable system comprising first, second and third cables, each including a conduit and a strand extending through the conduit, wherein the first strand is the actuator strand and the second strand and third strand are connected to be actuated,
a housing,
a member movable axially relative to the housing, and
a clutch between the housing and the member comprising a plurality of collet members which are movable radially and longitudinally and surround the member,
a spring extending between the collet housing and the first conduit,
said housing being attached to the strand of the second cable,
said inner member being attached to the third strand,
such that when a load is applied to the strand of the first cable, the strand tends to move toward the collet housing, the resisting force created by the second and third cables causing the collets to be forced into locking position to sustain the load, and when there is slack in the system, the spring exerts force on the housing moving the collets out of engagement with the member until the slack is removed and a balance of force occurs and the collets re-engage the inner member,
means connecting said housing and said second strand.

* * * * *